US005716546A

United States Patent [19]

Cox et al.

[11] Patent Number: 5,716,546

[45] Date of Patent: Feb. 10, 1998

[54] REDUCTION OF LAG IN YTTRIUM TANTALATE X-RAY PHOSPHORS

[75] Inventors: James R. Cox, Monroeton, Pa.; Joseph A. Cooper, Atlanta, Ga.; Cheryl M. Forster, Granville, Ohio; Barry G. DeBoer, Ulster, Pa.; Vaddi Butchi Reddy, Sayre, Pa.; Ronald E. Karam, Towanda, Pa.

[73] Assignee: Osram Sylvania Inc., Danvers, Mass.

[21] Appl. No.: 735,769

[22] Filed: Oct. 23, 1996

[51] Int. Cl.$^{6}$ .................................................... C09K 11/78

[52] U.S. Cl. .................................. 252/301.4 R; 423/593; 423/263

[58] Field of Search ..................... 252/301.4 R; 423/593, 423/263

[56] References Cited

U.S. PATENT DOCUMENTS

| | | | |
|---|---|---|---|
| 4,225,653 | 9/1980 | Brixner | 252/301.4 R |
| 4,225,673 | 9/1980 | Brixner | 252/301.4 R |
| 4,857,741 | 8/1989 | Yokota et al. | 250/486.1 |
| 4,959,174 | 9/1990 | Nakajima et al. | 252/301.4 R |
| 5,009,807 | 4/1991 | Reddy | 252/301.4 H |
| 5,112,524 | 5/1992 | Reddy et al. | 252/301.4 R |
| 5,141,673 | 8/1992 | Zegarski | 252/301.4 R |

FOREIGN PATENT DOCUMENTS

| | | | |
|---|---|---|---|
| 57-168982 | 10/1982 | Japan | 252/301.4 R |

OTHER PUBLICATIONS

Brixner, L.H. & Chen, H.Y., *On the Structural and Luminescent Properties of the M' $LnTaO_4$ Rare Earth Tantalates,* J. Electrochem. Soc., v 130, n. 12, 2435–43 (1983), no month.

Blasse, G. & Bril, A., *Luminescene Phenomena in Compounds with Ferusonite Structure,* J. Luminescene, 3, 109–131 (1970), no month.

Blasse, G. & Bril, *Luminescence in Some Tantalate Host Lattices,* J. Solid State Chem., 3, 69–74 (1971), no month.

Derwent WPI Abstract, WPI Acc. No. 82–01258J/47, JP 571689892, (1982), no month.

*Primary Examiner*—Melissa Bonner
*Attorney, Agent, or Firm*—Robert F. Clark

[57] ABSTRACT

Phosphor lag was reduced to acceptable levels in high lag monoclinic M' yttrium tantalate x-ray phosphors through the addition of minor amounts europium to the phosphors. In particular, europium was added to yttrium tantalate phosphors containing terbium and to phosphors formulated with a stoichiometric excess of yttrium.

19 Claims, 4 Drawing Sheets

REDUCTION OF LAG IN YTTRIUM TANTALATE X-RAY PHOSPHORS

TECHNICAL FIELD

This invention relates to yttrium tantalate x-ray phosphors. More particularly, it relates to the reduction of lag in monoclinic M' yttrium tantalate x-ray phosphors by the addition of europium.

BACKGROUND ART

Monoclinic M' yttrium tantalate x-ray phosphors are predominately used in x-ray intensifying screens for medical applications. The high density of $YTaO_4$ (7.56 g/cm$^3$) gives these phosphors a very good x-ray stopping capability and the emission of the Ta-O charge transfer band centered near 337 nm overlaps the sensitive region of x-ray films. Examples of these phosphors are given in U.S. Pat. Nos. 5,009,807, 5,112,524 and 4,225,653 which are incorporated herein by reference. These phosphors are incorporated into x-ray intensifying screens and used in combination with x-ray films to produce x-ray images.

One adverse property associated with x-ray phosphors is the presence of an afterglow emission which persists after the x-ray excitation has ceased. If afterglow is too long, the image quality of the x-ray film will be compromised. Afterglow on the order of minutes to hours is generally referred to as lag. Phosphor lag has been observed in yttrium tantalate phosphors and is the cause of much concern.

Thus, it would be an advantage to be able to reduce the lag in high lag yttrium tantalate x-ray phosphors to levels which do not adversely affect the image quality of x-ray films.

SUMMARY OF THE INVENTION

It is an object of the invention to obviate the disadvantages of the prior art.

It is another object of the invention to reduce the phosphor lag of monoclinic M' yttrium tantalate based x-ray phosphors.

It is a further object of the invention to provide a method for reducing the phosphor lag of monoclinic M' yttrium tantalate x-ray phosphors.

In accordance with one aspect the invention, there is providied a monoclinic M' yttrium tantalate based x-ray phosphor containing an amount of europium sufficient to reduce powder lag to less than or equal to about 0.04.

In accordance with another aspect of the invention, there is provided a method for reducing lag in a monoclinic M' yttrium tantalate-based x-ray phosphor comprising adding an amount of a europium compound to a mixture of compounds selected to form the phosphor and firing the mixture at a temperature, and for a time, sufficient to form the phosphor, the amount of the europium compound being sufficient to reduce powder lag to less than or equal to about 0.04.

DESCRIPTION OF THE PREFERRED EMBODIMENTS

Figure 1:
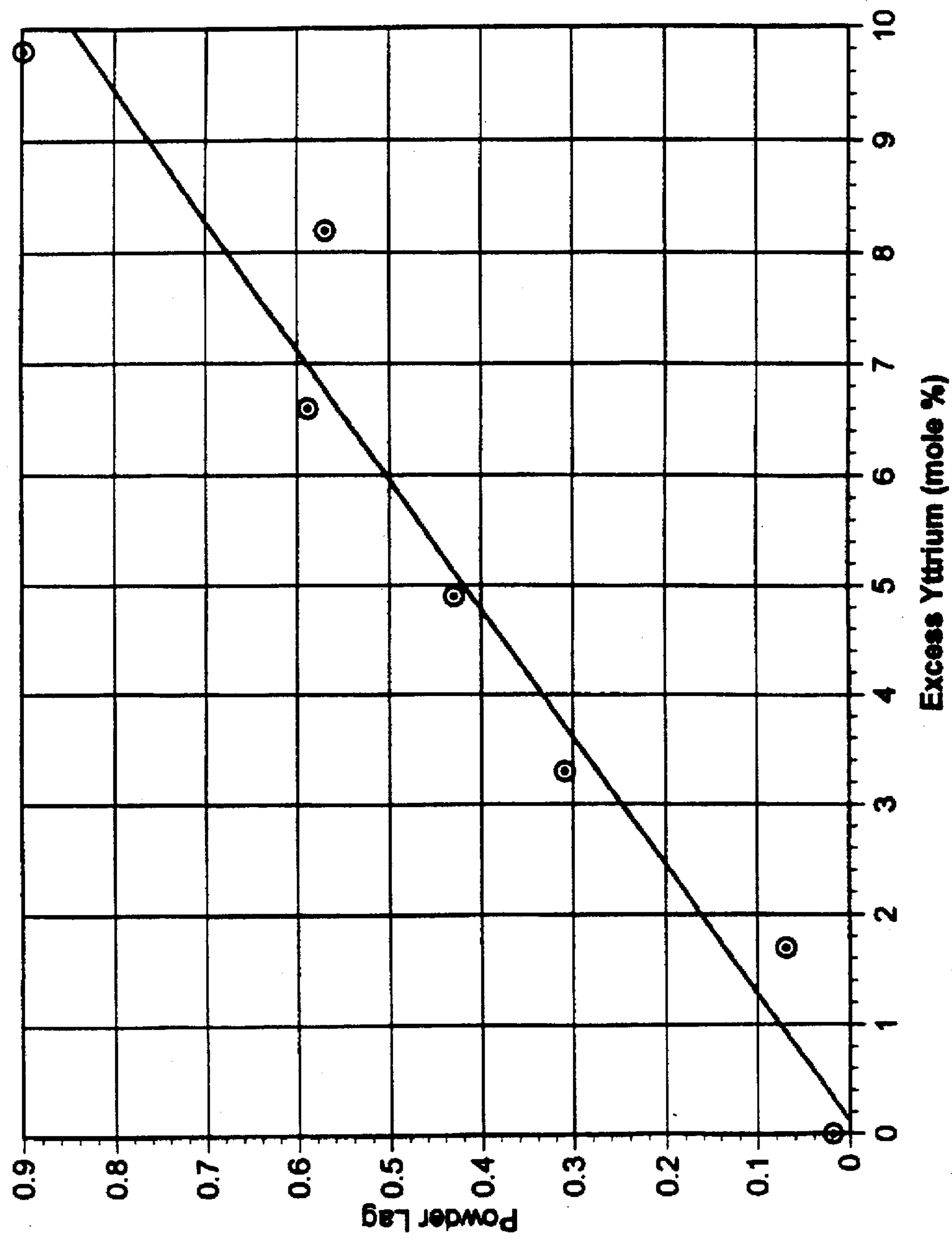
FIG. 1 is a graphical representation of the effect of excess yttrium on powder lag.

For a better understanding of the present invention, together with other and further objects, advantages and capabilities thereof, reference is made to the following disclosure and appended claims taken in conjunction with the above-described drawings.

Phosphor lag is the difference between the optical density of a region of x-ray film which has been exposed to the afterglow emission from the phosphor (after the phosphor has been exposed to x-rays under specified conditions) and the optical density of a region of x-ray film which was not exposed to the afterglow emission. Optical density (OD) is defined as $OD=\log_{10}(I_i/I_t)$ where $I_i$ is the intensity of the incident light and $I_t$ is the intensity of the transmitted light through the developed x-ray film. Phosphor lag can be expressed in terms of either powder lag or screen lag. Powder lag is a measure of phosphor lag for the "as is" phosphor powder. Screen lag is a measure of phosphor lag after the phosphor has been incorporated into an x-ray screen.

As stated previously, yttrium tantalate x-ray phosphors can exhibit high levels of phosphor lag. In particular, severe lag has been observed in yttrium tantalate phosphors containing minor amounts of terbium and in phosphors formulated with a stoichiometric excess of yttrium. For example, very minor terbium contamination, equal to or greater than about 2 ppm by mole in the phosphor, produces phosphors exhibiting unacceptable levels of lag.

We have found that the addition of minor amounts of europium reduces the phosphor lag of high lag yttrium tantalate phosphors to acceptable levels, i.e., powder lag values of about 0.04 or less. The amount of europium needed to reduce the phosphor lag to an acceptable level varies depending on the composition of the phosphor. Preferably, the europium concentration in the phosphor ranges from about 100 to about 300 ppm by mole in the phosphor.

The following non-limiting examples are presented.

Powder lag was measured by packing phosphor samples in 75 mm×25 mm×2 mm thick brass plaques having a 13.4 mm diameter hole through the center. The phosphor was packed to a thickness of 2 mm by first placing a piece of transparent polyester tape (3M Company No. 850) on the front side of the plaque to cover the hole, then turning the plaque over and filling the hole with phosphor powder. The plaque was tapped repeatedly until no more phosphor would pack into the hole. Excess phosphor above the surface of the hole was removed by carefully scraping with a razor blade across the surface of the plaque thereby smoothing the phosphor surface and making the surface of the phosphor level with the surface of the plaque. A round pre-gummed paper label was placed on the back of the plaque to keep the phosphor in the hole. The packed plaques were placed with the polyester tape facing up into an empty 8×10 in. stainless steel film cassette. The plaques were exposed to x-rays generated by a General Electric model MST-625II medical x-ray generator using a tungsten source operating at 90 kV and 25 mA (the x-rays were made to pass through a collimator which provided a filtering effect equivalent to a 2 mm thick sheet of aluminum). The cassette was oriented such that the side of the plaques with the pre-gummed label faced the x-rays. After the plaques were excited with x-rays for 6 seconds at a distance of 30 inches from the x-ray tube, a one minute time period was allowed to elapse after which the x-ray film was placed over the plaques and the cassette was closed. For these phosphors, DuPont UltraVision-G x-ray film was used. After 4 hours, the film was taken out of the cassette and developed in a Kodak X-Omat model M7A automatic film processor. A MacBeth model TD932 optical densitometer was used to compare the optical densities of the regions exposed to the afterglow emission from the phosphor samples with unexposed regions of the film. The difference in the optical density measurements between the exposed and unexposed regions is defined as the powder lag. For example, an excited phosphor may produce an exposed region of film having an optical density (OD) of 0.26 while the unexposed region of the same film may be 0.25. The powder lag for such a sample would be 0.26–0.25 or 0.01.

Two different formulations for monoclinic M' yttrium tantalate x-ray phosphors were investigated. One formulation is represented by the general formula, $YSr_aTaO_4$, where a is from greater than 0 to about 0.04. As written, this formulation contains a stoichiometric excess of yttrium. A stoichiometric excess of yttrium as used herein means that amount of yttrium which is in excess of the site compensated formula for the phosphor. The other formulation is represented by the general formula, $Y_{1-a}Sr_aTaO_4$, where a is from 0 to about 0.1. The specific stoichiometry for each formulation investigated is given in Table 1. Formulation 1 has 4 mole percent (mole %) of strontium which is not site compensated for in the bulk phosphor, i.e., the number of moles of yttrium in the formula has not been decremented by the equivalent number of moles of strontium. Formulation 2 has 2 mole % Sr that is site compensated by decrementing the molar amount of Y in the phosphor formula by an equivalent molar amount of strontium (a 1:1 substitution of Sr for Y). Formulation 1 phosphors are typically brighter than phosphors made according to formulation 2.

TABLE 1

| Formulation | Stoichiometry | (Y + Sr) | wt % of $Li_2SO_4$ Flux |
|---|---|---|---|
| 1 | $YSr_{0.04}TaO_4$ | 1.04 | 50 |
| 2 | $Y_{0.98}Sr_{0.02}TaO_4$ | 1.00 | 28 |

Samples of monoclinic M' yttrium tantalate x-ray phosphor were prepared by blending stoichiometric quantities of yttrium oxide ($Y_2O_3$), strontium carbonate ($SrCO_3$) and tantalum oxide ($Ta_2O_5$) with an amount of a lithium sulfate, $Li_2SO_4$, reactive flux. The amount of flux used was different for each formulation. Table 1 gives the weight percentage of the flux based on the weight of the raw material blend. Small scale samples were blended on a paint shaker for about 20 minutes. Samples prepared on a production scale were blended in a 16 quart V-blender.

The blended materials were loaded into alumina crucibles with lids and placed into an electric furnace at about 800° C. in air. The temperature of the furnace was increased to about 1290° C. over a 6 hour period, held at about 1290° C. for 7 to 12 hours, and then cooled to about 800° C. over a one hour period. The fired cakes were placed in deionized (DI) water and allowed to disintegrate. The resulting slurry was stirred and allowed to settle. Repeated washings with DI water were performed until the residual flux was removed. A qualitative $BaSO_4$ precipitate test was used to test the supernatant for the presence of residual flux. After removing the residual flux, the phosphors were filtered, dried at 120° C., and screened through a #325 mesh stainless steel sieve. The screened phosphor was then dry blended with 0.02 wt % of Cab-O-Sil (a fine silica manufactured by Cabot Corp.) to improve flowability.

Many of the phosphors synthesized using formulation 1 exhibited high lag values even though each phosphor had acceptable levels of Tb as measured by Glow Discharge Mass Spectrometry (GDMS). By comparison, phosphors made according to formulation 2 had acceptable levels of lag. Table 2 compares the lag values of phosphors made according to the two formulations. The results indicate that the higher powder lag value for formulation 1 is being caused by the excess yttrium.

TABLE 2

| Formulation | Powder lag |
|---|---|
| 1 | 0.07 |
| 2 | 0.01 |

One of phosphors made according to formulation 1 exhibited a low lag value of 0.01. Analysis of the $Y_2O_3$ lot used to make this sample found that it contained 190 ppm by wt. Eu, indicating that the addition of Eu reduces the amount of lag in phosphors formulated with excess yttrium. FIG. 1 illustrates the increase in lag with increasing excess yttrium. The base formulation for the samples in FIG. 1 was $Y_{0.98}Sr_{0.02}TaO_4$ (formulation 2). Powder lag is plotted as a function of the amount of yttrium in excess of formulation 2. FIG. 1 shows an apparent linear correlation between the amount of excess yttrium added and increased lag.

Through a similar analysis of another $Y_2O_3$ lot, it was determined that the presence of very small amounts of terbium in the phosphor caused very high powder lag values, i.e., on the order of 1.9. Based on this result, a systematic set of experiments was conducted to evaluate the effect of terbium and europium on phosphor lag. Europium and/or terbium dopants were incorporated into several formulation 2 phosphor samples by doping the precursor mixture with $Tb_4O_7$ and/or $Eu_2O_3$ to yield phosphors having the general formula $Y_{0.98}Sr_{0.02}TaO_4$:Tb, Eu. The doping procedure involved adding a small amount of $Tb_4O_7$ or $Eu_2O_3$ to a large amount of $Y_2O_3$ and mixing thoroughly. Such an approach was necessary in order to accurately weigh the very small amounts of dopant. An appropriate amount of the doped yttrium oxide was then blended with the other phosphor precursors and the phosphors were prepared as described above. The dopant levels in the phosphor ranged from about 5 to about 300 ppm by mole Eu (or Tb).

Figure 2:
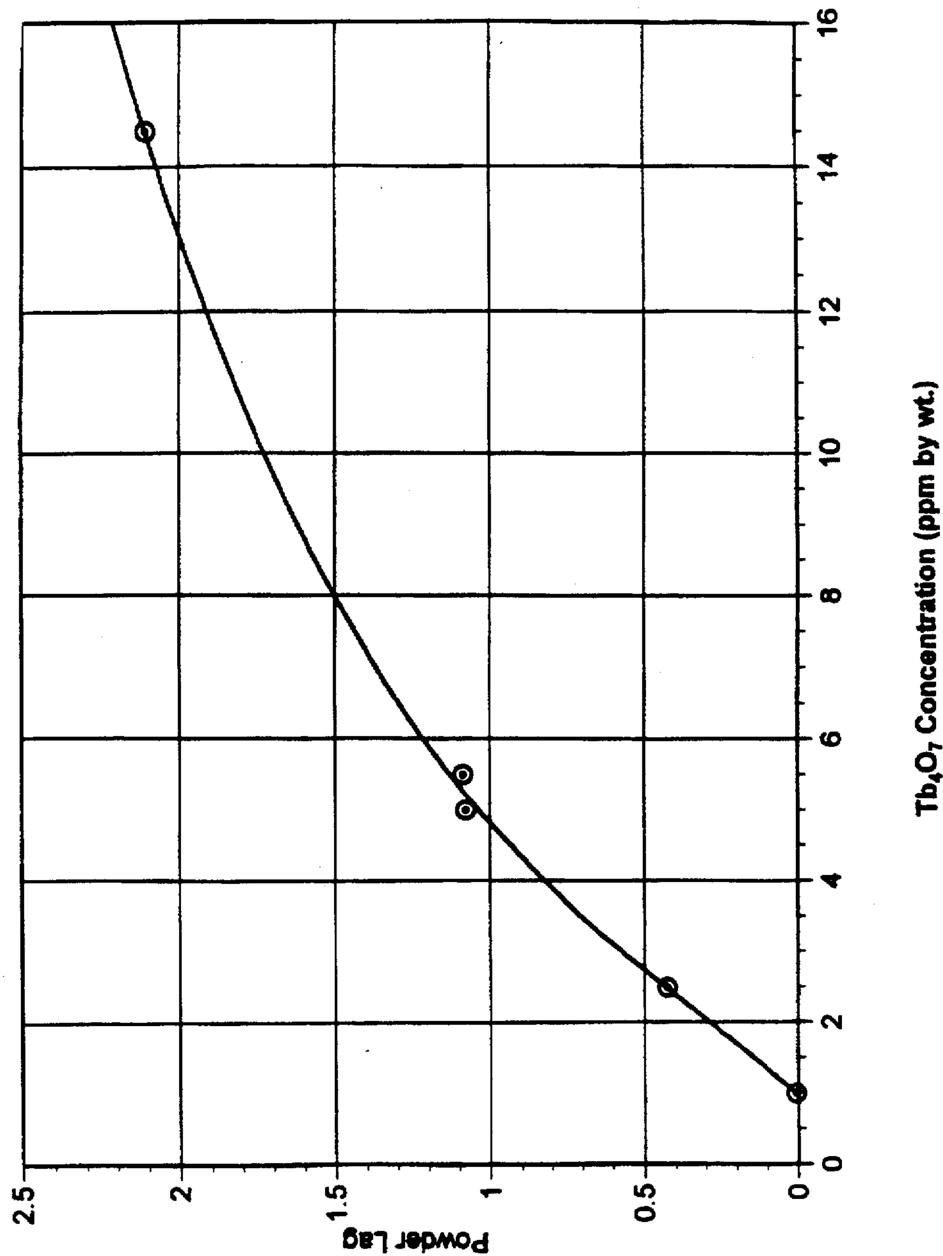
FIG. 2 is a graphical representation of the effect of terbium on powder lag.

Phosphors that were doped solely with terbium showed substantial amounts of lag. The data from these phosphors is represented in FIG. 2 which is a plot of powder lag versus the concentration of $Tb_4O_7$ (ppm by wt.) in the $Y_2O_3$ phosphor precursor. From FIG. 2, it is clear that very small quantities of the $Tb_4O_7$ dopant greatly increase phosphor lag.

Figure 3:
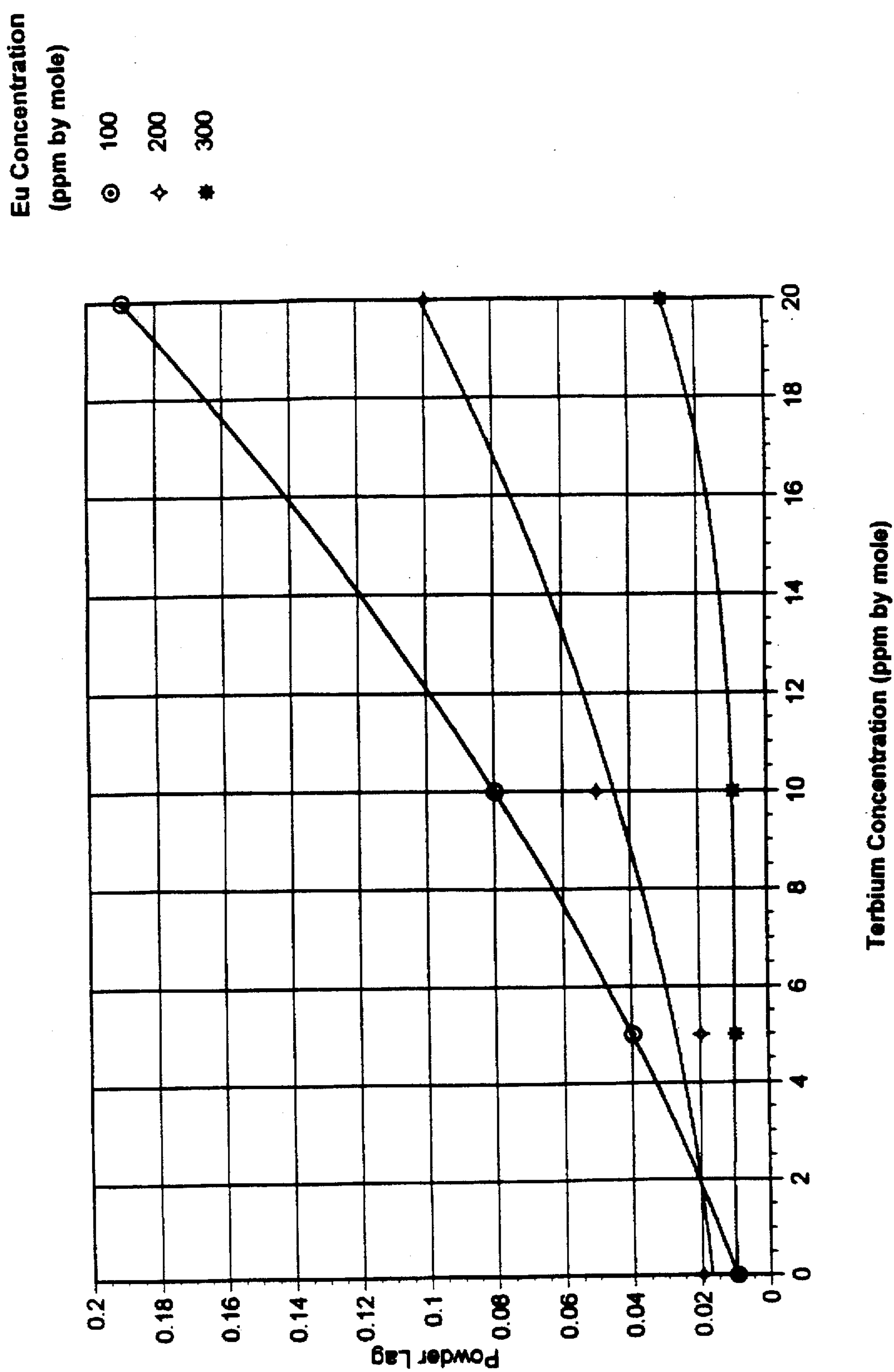
FIG. 3 is a graphical representation of powder lag as a function of terbium and europium concentrations.
Figure 4:
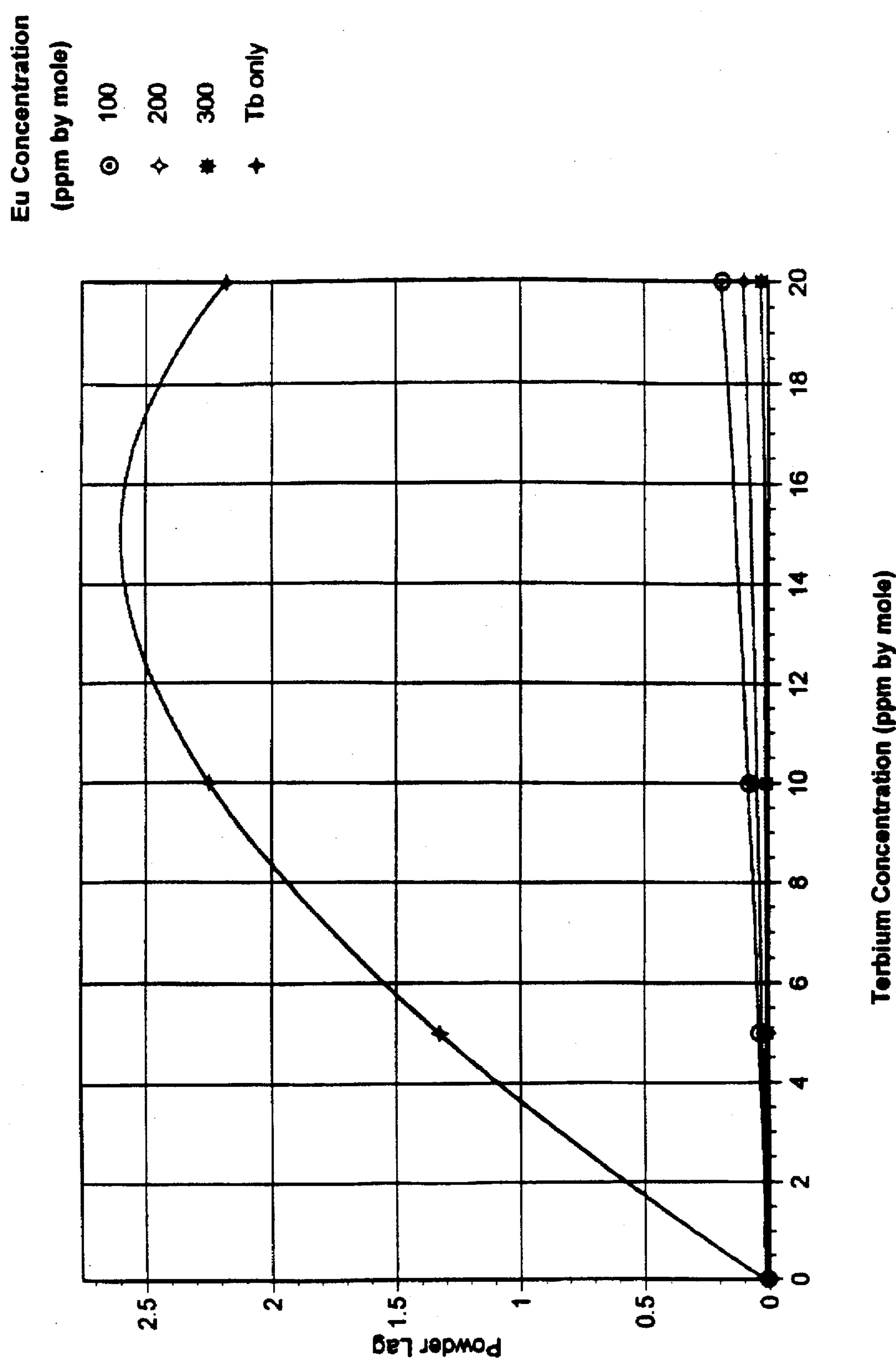
FIG. 4 is a graphical representation illustrating the reduction in powder lag caused by europium addition.

Phosphors that were co-doped with terbium and europium exhibited lower levels of lag. The data from these phosphors is represented in FIG. 3 which is a plot of powder lag versus terbium concentration (ppm by mole in phosphor) at three different europium levels (ppm by mole in phosphor). At 300 ppm by mole Eu, the powder lag is below 0.04 for the entire range of Tb concentrations represented. The affect that the addition of the Eu dopant to the phosphor has on lag is dramatically apparent in FIG. 4 which combines the results represented in FIG. 3 with the results for a Tb-only doped series of phosphors.

Thus, it has been shown that the addition of europium to yttrium tantalate phosphors results in a dramatic reduction in phosphor lag. It should be noted that these phosphors also exhibit a distinct red $Eu^{3+}$ emission. However, the x-ray film used in conjunction with yttrium tantalate x-ray phosphors is not sensitive to this region of the electromagnetic spectrum and is therefore not adversely affected by the red $Eu^{3+}$ emission.

While there has been shown and described what are at the present considered the preferred embodiments of the invention, it will be obvious to those skilled in the art that various changes and modifications may be made therein without departing from the scope of the invention as defined by the appended claims.

We claim:

1. A monoclinic M' yttrium tantalate based x-ray phosphor containing terbium in an amount equal to or greater than about 2 ppm by mole in the phosphor and an amount of europium sufficient to reduce powder lag to less than or equal to about 0.04.

2. The phosphor of claim 1 wherein the phosphor contains terbium in an amount from about 2 to about 20 ppm by mole in the phosphor and the amount of europium is from about 100 to about 300 ppm by mole in the phosphor.

3. A monoclinic M' yttrium tantalate based x-ray phosphor having a general formula $Y_{1-a}Sr_aTaO_4$ where a is from 0 to about 0.1, the phosphor containing terbium in an amount from about 2 to about 20 ppm by mole in the phosphor and an amount of europium from about 100 to about 300 ppm by mole in the phosphor.

4. The phosphor of claim 3 wherein a is about 0.02.

5. A monoclinic M' yttrium tantalate based x-ray phosphor formulated to contain a stochiometric excess of yttrium and containing an amount of europium sufficient to reduce powder lag to less than or equal to about 0.04.

6. The phosphor of claim 5 wherein the phosphor has a general formula $YSr_aTaO_4$ where a is from greater than 0 to about 0.04.

7. The phosphor of claim 6 wherein the amount of europium is from about 100 to about 300 ppm by mole in the phosphor.

8. The phosphor of claim 7 wherein a is about 0.04.

9. A method for reducing lag in a monoclinic M' yttrium tantalate-based x-ray phosphor comprising adding an amount of a europium compound to a mixture of compounds selected to form the phosphor and firing the mixture at a temperature, and for a time, sufficient to form the phosphor, the amount of the europium compound being sufficient to reduce powder lag to less than or equal to about 0.04.

10. The method of claim 9 wherein the europium compound is europium oxide and the mixture of compounds selected to form the phosphor contains a flux, yttrium oxide, tantalum oxide, and optionally, strontium carbonate.

11. The method of claim 10 wherein the flux contains lithium sulfate.

12. The method of claim 9 wherein the phosphor contains terbium in an amount equal to or greater than about 2 ppm by mole in the phosphor.

13. The method of claim 12 wherein the amount of the europium compound yields a europium concentration from about 100 to about 300 ppm by mole in the phosphor.

14. The method of claim 9 wherein the phosphor contains terbium in an amount from about 2 to about 20 ppm by mole in the phosphor and the amount of the europium compound yields a europium concentration from about 100 to about 300 ppm by mole in the phosphor.

15. The method of claim 9 wherein the phosphor has a general formula $Y_{1-a}Sr_aTaO_4$ where a is from 0 to about 0.1.

16. The method of claim 15 wherein the phosphor contains terbium in an amount from about 2 to about 20 ppm by mole in the phosphor and the amount of the europium compound yields a europium concentration from about 100 to about 300 ppm by mole in the phosphor.

17. The method of claim 9 wherein the phosphor is formulated to contain a stoichiometric excess of yttrium.

18. The method of claim 17 wherein the phosphor has a general formula $YSr_aTaO_4$ where a is from greater than 0 to about 0.04.

19. The method of claim 18 wherein the amount of the europium compound yields a europium concentration from about 100 to about 300 ppm by mole in the phosphor.

* * * * *